(12) United States Patent
Chen et al.

(10) Patent No.: US 12,052,739 B1
(45) Date of Patent: Jul. 30, 2024

(54) DEVICE AND METHOD FOR WIRELESS COMMUNICATION

(71) Applicant: BEIJING LEAPING LINE LINK TECHNOLOGY CO., LTD., Beijing (CN)

(72) Inventors: Jinhui Chen, Beijing (CN); Jiaqi Wu, Beijing (CN)

(73) Assignee: BEIJING LEAPING LINE LINK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/692,807

(22) PCT Filed: Aug. 19, 2022

(86) PCT No.: PCT/CN2022/113622
§ 371 (c)(1),
(2) Date: Mar. 16, 2024

(87) PCT Pub. No.: WO2023/040580
PCT Pub. Date: Mar. 23, 2023

(30) Foreign Application Priority Data

Sep. 19, 2021  (CN) .......................... 202111011388.1

(51) Int. Cl.
*H04W 72/541* (2023.01)
*H04L 5/00* (2006.01)
*H04L 27/38* (2006.01)

(52) U.S. Cl.
CPC ......... *H04W 72/541* (2023.01); *H04L 5/0023* (2013.01); *H04L 27/38* (2013.01)

(58) Field of Classification Search
None
See application file for complete search history.

(56) References Cited

U.S. PATENT DOCUMENTS

| 11,418,300 B2 | 8/2022 | Ibars Casas |
| 2019/0081836 A1* | 3/2019 | Hadani ................. H04L 5/0023 |
| 2021/0250138 A1 | 8/2021 | Ibars Casas |

FOREIGN PATENT DOCUMENTS

| CN | 110677359 A | 1/2020 |
| CN | 111786763 A | 10/2020 |
| CN | 112929316 A | 6/2021 |
| CN | 113193935 A | 7/2021 |

(Continued)

OTHER PUBLICATIONS

International Search Report in the international application No. PCT/CN2022/113622, mailed on Nov. 16, 2022, 2 pages.

(Continued)

*Primary Examiner* — Diane L Lo
(74) *Attorney, Agent, or Firm* — Syncoda LLC; Feng Ma

(57) ABSTRACT

A method for wireless communication includes: dividing a delay Doppler resource occupied by a first orthogonal time frequency space (OTFS) symbol into M delay Doppler regions, the first delay Doppler region being one of the M delay Doppler regions, M being a natural number not less than 1; and dividing the first time delay Doppler region into an edge region and a non-edge region in a time delay displacement dimension and a Doppler displacement dimension, and setting the signal average power of the edge region to be different from the signal average power of the non-edge region.

10 Claims, 13 Drawing Sheets

(56) References Cited

FOREIGN PATENT DOCUMENTS

CN         113726715 A    11/2021
WO     2016176642 A1   11/2016

OTHER PUBLICATIONS

CN first office action in Application No. 202111011388.1, mailed on Oct. 9, 2022.
CN second office action (Notice refusal to grant a patent (where such notice indicates allowable claims)) in Application No. 202111011388.1, mailed on Jan. 19, 2023.
CN notification to Grant Patent Right for Invention in Application No. 202111011388.1, mailed on Apr. 9, 2023.

\* cited by examiner

DEVICE AND METHOD FOR WIRELESS COMMUNICATION

CROSS-REFERENCE TO RELATED APPLICATIONS

The present application is a national stage of International Application No. PCT/CN2022/113622, filed on Aug. 19, 2022, which claims priority to Chinese Patent Application No. 202111011388.1, filed on Sep. 19, 2021, the disclosures of the above-referenced applications are hereby incorporated by reference in their entirety.

TECHNICAL FIELD

The disclosure relates to a device and method for a wireless communication system.

BACKGROUND

Orthogonal Time Frequency Space (OTFS) modulation technology realizes multiplexing and diversity gain by placing Quadrature Amplitude Modulation (QAM) symbols on delay-Doppler domain elements composed of a delay shift dimension and a Doppler shift dimension. The OTFS technology can be applied to a multi-user uplink access system, namely, a communication system with multiple transmitting terminals and a receiving terminal.

SUMMARY

A brief overview of the disclosure is given below in order to provide a basic understanding of certain aspects of the disclosure. It should be understood that this overview is not an exhaustive overview of the disclosure. It is not intended to define a critical or essential part of the disclosure or to limit the scope of the disclosure. Its purpose is merely to give certain concepts in a simplified form as a preamble to a more detailed description to be discussed later.

Through research, the inventor found that in a multi-user OTFS system, due to delay spread and Doppler spread will bring multi-user interference, the performance of the multi-user OTFS system is degraded. Multi-user interference caused by delay spread and Doppler spread mainly occurs in edge regions of delay-Doppler regions occupied by users. Therefore, the performance of the multi-user OTFS system can be further improved by artificially setting the power difference between edge regions of the neighboring users and using iterative serial de-interference decoding method in receiving terminal to solve the users with relatively less interference in the edge region, and then removing the successfully decoded users as interference before solving their neighboring users.

According to an aspect of the disclosure, the disclosure provides a device for wireless communication, including one or more processors and a transceiver unit. The one or more processors are configured to divide a delay-Doppler resource occupied by a first OTFS symbol into M delay-Doppler regions, a first delay-Doppler region is one of the M delay-Doppler regions, and M is a natural number not less than 1; divide the first delay-Doppler region into an edge region and a non-edge region in a delay shift dimension and a Doppler shift dimension, and set the average signal power of the edge region to be different from the average signal power of the non-edge region; and generate the first OTFS symbol. The transceiver unit is configured to transmit the first OTFS symbol.

According to another aspect of the disclosure, the disclosure provides a device for wireless communication, including a transceiver unit and one or more processors. The transceiver unit is configured to receive a first OTFS symbol. The one or more processors are configured to: demodulate the first OTFS symbol; divide a delay-Doppler resource occupied by the first OTFS symbol into M delay-Doppler regions, K delay-Doppler regions of the M delay-Doppler regions are respectively used for placing data or pilot signals by K transmitting terminals, a first delay-Doppler region is one of the K delay-Doppler regions, the first delay-Doppler region is used for placing data or pilot signals by a first transmitting terminal, M and K are natural numbers not less than 1, and M is not less than K; and decode a data signal on the first OTFS symbol, the first delay-Doppler region comprises an edge region and a non-edge region in a delay shift dimension and a Doppler shift dimension, and the average signal power of the edge region is different from the average signal power of the non-edge region.

According to an aspect of the disclosure, the disclosure also provides a method for wireless communication, including the following operations. A delay-Doppler resource occupied by a first OTFS symbol is divided into M delay-Doppler regions, a first delay-Doppler region is one of the M delay-Doppler regions, and M is a natural number not less than 1. The first delay-Doppler region is divided into an edge region and a non-edge region in a delay shift dimension and a Doppler shift dimension, and the average signal power of the edge region is set to be different from the average signal power of the non-edge region. The first OTFS symbol is generated. The first OTFS symbol is transmitted.

According to another aspect of the disclosure the disclosure also provides a method for wireless communication, including the following operations. A first OTFS symbol is received. The first OTFS symbol is demodulated. A delay-Doppler resource occupied by the first OTFS symbol is divided into M delay-Doppler regions. K delay-Doppler regions of the M delay-Doppler regions are respectively used for placing data or pilot signals by K transmitting terminals, a first delay-Doppler region is one of the K delay-Doppler regions, the first delay-Doppler region is used for placing data or pilot signals by a first transmitting terminal, M and K are natural numbers not less than 1, and M is not less than K. A data signal on the first OTFS symbol is decoded, the first delay-Doppler region comprises an edge region and a non-edge region in a delay shift dimension and a Doppler shift dimension, and the average signal power of the edge region is different from the average signal power of the non-edge region.

According to other aspects of the disclosure, there is also provided a computer program code and a computer program product for implementing the method for wireless communication and a computer readable storage medium on which the computer program code for implementing the method for wireless communication for base station side and user equipment side is recorded.

According to the device and method for wireless communication of the disclosure, a user transmitting terminal in a multi-user OTFS system can allocate the average signal power for the edge region in the delay shift dimension and the Doppler shift dimension in the allocated delay-Doppler region, which is different from the average signal power of the non-edge region, thereby facilitating the multi-user receiving terminal to use an iterative serial de-interference receiver to decode multi-user multiplexed OTFS symbols and improving decoding efficiency.

The above and other advantages of the disclosure will become more apparent from the following detailed description of preferred embodiments of the disclosure taken in conjunction with the accompanying drawings.

BRIEF DESCRIPTION OF THE DRAWINGS

To further illustrate the above and other advantages and features of the disclosure, a further detailed description of the specific implementations of the disclosure will be given below in conjunction with the accompanying drawings. The drawings together with the detailed description below are contained in this Description and form part thereof. Elements with the same function and structure are represented by the same reference symbol. It should be understood that these drawings describe only typical examples of the disclosure and should not be regarded as limiting the scope of the disclosure. In the drawings.

DETAILED DESCRIPTION

Figure 1:
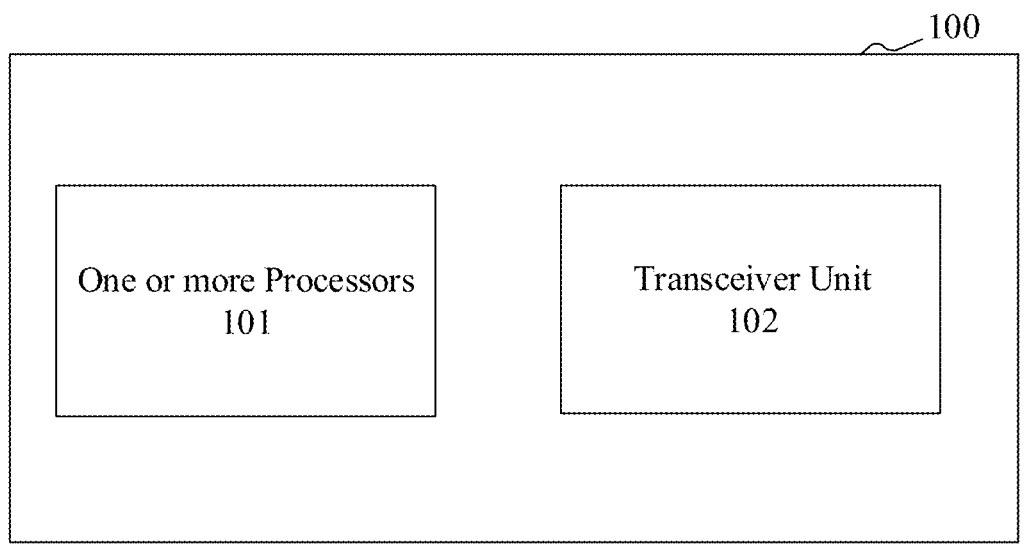
FIG. 1 is a structural block diagram of a device for wireless communication according to an embodiment of the disclosure.

Exemplary embodiments of the disclosure will be described below in conjunction with the accompanying drawings. For the sake of clarity and conciseness, not all features of practical implementations are described in the Description. However, it should be understood that many embodiment-specific decisions must be made during the development of any such practical embodiment in order to achieve specific goals of developer, such as meeting system and business-related limitations, and these limitations may vary from an implementation to another implementation. In addition, it should be understood that while development can be very complex and time-consuming, such development is merely a routine task for those skilled in the art who benefit from contents of the disclosure.

Here, it should also be noted that in order to avoid obscuring the disclosure due to unnecessary details, only the equipment structures and/or processing operations closely related to the solution according to the disclosure are shown in the drawings, and other details not related to the disclosure are omitted.

First Embodiment

Embodiment of the disclosure can be applied to multi-user systems in various communication systems, such as: Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE) system, New Radio (NR), evolution system of NR system, LTE-based access to unlicensed spectrum (LTE-U) system, NR-based access to unlicensed spectrum (NR-U) system, Universal Mobile Telecommunications System (UMTS), Wireless Local Area Network (WLAN), Wireless Fidelity (WiFi), next generation communication system or other communication systems, etc.

Embodiment of the disclosure does not limit the applied spectrum. For example, embodiment of the disclosure can be applied to licensed spectrum or unlicensed spectrum.

FIG. 1 is a structural block diagram illustrating a device 100 for wireless communication according to an embodiment of the disclosure. The device 100 includes one or more processors 101 and a transceiver unit 102. The one or more processors 101 are configured to: divide a delay-Doppler resource occupied by a first OTFS symbol into M delay-Doppler regions, a first delay-Doppler region is one of the M delay-Doppler regions, and M is a natural number not less than 1; divide the first delay-Doppler region into an edge region and a non-edge region in a delay shift dimension and a Doppler shift dimension, and set the average signal power of the edge region to be different from the average signal power of the non-edge region; and generate the first OTFS symbol. The transceiver unit 102 is configured to transmit the first OTFS symbol.

The wireless communication system in which the device 100 is located uses a multi-user OTFS modulation technique. In Orthogonal Frequency Division Multiplexing (OFDM) systems, constellation-modulated Phase Shift Key (PSK) or Quadrature Amplitude Modulation (QAM) symbols are placed in grids in time-frequency domain. In 3GPP 5G physical layer protocol, each grid is a Resource Element (RE), corresponding to a set of two-dimensional time-frequency domain shift coordinates. In OTFS system, PSK or QAM symbols are placed in grids in delay-Doppler domain and each grid in delay-Doppler domain is a delay-Doppler resource element, corresponding to a set of two-dimensional delay-Doppler domain shift coordinates. An OTFS symbol includes $N_tN_f$ two-dimensional delay-Doppler domain elements composed of $N_t$ consecutive Doppler shifts and $N_f$ consecutive delay shifts. After the Symplectic Fourier Transform (SFT), the modulation symbols on each delay-Doppler element in an OTFS symbol are spread to time-frequency domain resource composed of $N_f$ subcarriers and $N_t$ OFDM symbols corresponding to the OTFS symbol, in order to obtain more time-frequency diversity gain compared with OFDM system. In a multi-user OTFS system, multiple transmitting terminals multiplex one OTFS symbol, and different transmitting terminals occupy different delay-Doppler domains within the OTFS symbol to transmit information. In a multi-user OTFS system, even if multiple transmitting terminals occupy non-overlapping delay-Doppler domains in the same OTFS symbol, there will be inter-user interference due to Doppler spread and delay spread, which can be solved by a signal power allocation scheme facilitating iterative serial de-interference receiver.

In this embodiment and the following embodiments, the device 100 may be a user equipment, such as a mobile terminal (such as a smart phone, a tablet personal computer (PC), a notebook PC, a portable game terminal, a portable/dongle mobile router, and a digital camera device) served by a base station or a vehicle-mounted terminal (such as a car navigation device), etc. The user equipment may also be implemented as a terminal performing machine-to-machine (M2M) communication (also referred to as a machine-type communication (MTC) terminal). Further, the user equipment may be a wireless communication module (such as an integrated circuit module including a single wafer) installed on each of the above terminals.

In addition, when other communication devices (such as a relay base station or a small base station or the like) need to communicate with the main base station, they may also be regarded as user equipment described herein. In the following description, a user equipment is mainly described as an example and it is understood that the scope of the disclosure is not limited thereto.

The processor 101 may be for example a central processing unit (CPU), a microprocessor, an integrated circuit module or the like with data processing capability.

Figure 2:
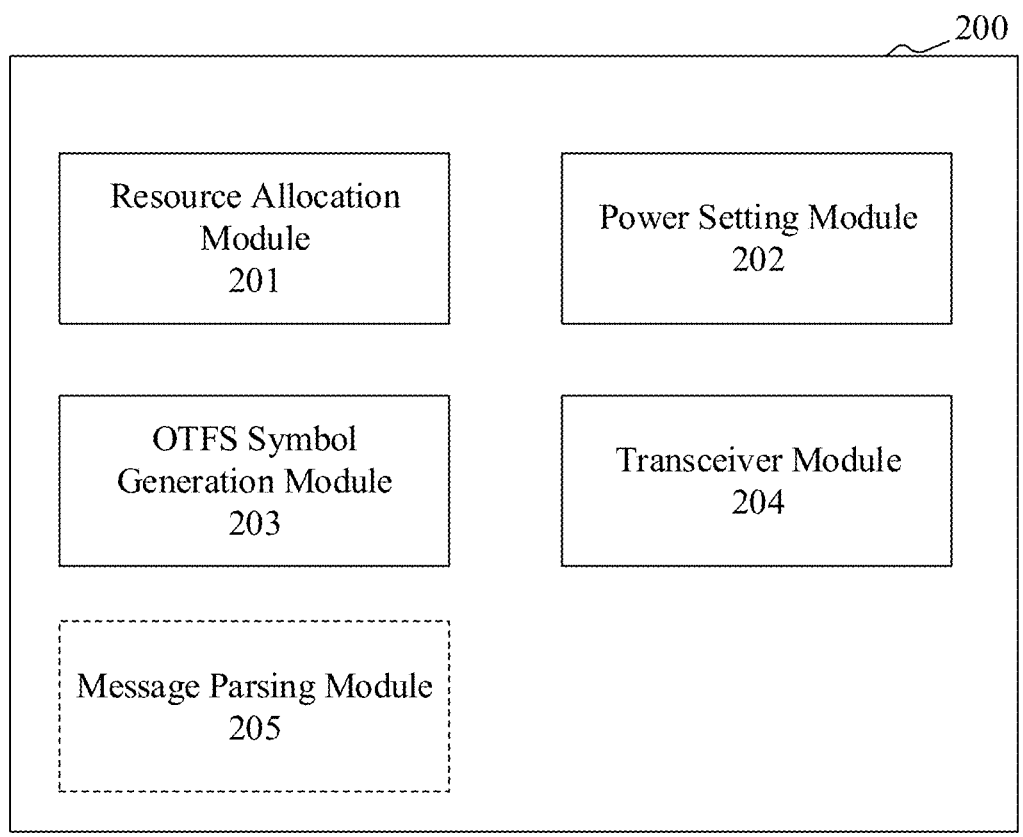
FIG. 2 is a structural block diagram of a specific implementation of a device for wireless communication according to an embodiment of the disclosure.

Accordingly. FIG. 2 is a structural block diagram illustrating a specific implementation of the device 100 (denoted in FIG. 2 as device 200), and the function and structure of the device 200 will be described in detail below with reference to this block diagram. As shown in FIG. 2, the device 200 includes a resource allocation module 201, a power setting module 202, an OTFS symbol generation module 203 and a transceiver module 204. The resource allocation module 201 is configured to divide a delay-Doppler resource occupied by a first OTFS symbol into M delay-Doppler regions, a first delay-Doppler region is one of the M delay-Doppler regions, and M is a natural number not less than 1. The power setting module 202 is configured to divide the first delay-Doppler region into an edge region and a non-edge region in a delay shift dimension and a Doppler shift dimension, and set the average signal power of the edge region to be different from the average signal power of the non-edge region. The OTFS symbol generation module 203 is configured to generate the first OTFS symbol. The transceiver module 204 is configured to transmit the first OTFS symbol.

In an example, the device 200 may further include a message parsing module 205. The transceiver module 204 is configured to receive a first message. The message parsing module 205 is configured to parse the first message, the first message is used by the device 200 to determine the edge region and the non-edge region.

Exemplary, the first message is used for determining a proportional relationship between the delay shift and the Doppler shift occupied by the edge region and non-edge region.

In an example, the device 200 may further include a message parsing module 205. The transceiver module 204 is configured to receive a second message. The message parsing module 205 is configured to parse the second message used for determining a difference between the average signal power of the edge region and the average signal power of the non-edge region.

Exemplary, the device 200 firstly determines the average signal power of the first delay-Doppler region, and then determines the average signal power of the edge region and the average signal power of the non-edge region based on the difference between the average signal power of the edge region and the average signal power of the non-edge region.

In an example, the power setting module 202 is configured to set the average signal power of the edge region to be less than the average signal power of the non-edge region.

Exemplary, the device 200 is assumed to be a transmitting device prioritized for decoding by the receiving terminal.

In an example, the power setting module 202 is configured to set the average signal power of the edge region to be larger than the average signal power of the non-edge region.

Exemplary, the device 200 is assumed to be a transmitting device decoded later by the receiving terminal. After successfully decoding other transmitting devices having priority for decoding, the receiving terminal calculates the interference estimation of other transmitting devices, performs de-interference on the received signal, and then decodes the data signal sent from the device 200.

In an example, the power setting module 202 is configured to set the average signal power of the edge region on the delay shift dimension to be identical to the average signal power of the edge region on the Doppler shift dimension.

In an example, the power setting module 202 is configured to set the average signal power of the edge region on the delay shift dimension to be different from the average signal power of the edge region on the Doppler shift dimension.

In an example, the resource allocation module 201 is configured to place no data or no pilot signals on M−1 delay-Doppler regions (other than the first delay-Doppler region) of the M delay-Doppler regions, and M is a natural number greater than 1.

To sum up, the device 100 and the device 200 can allocate different powers to the edge region and the non-edge region in the delay-Doppler region occupied by the transmitting terminal, thereby enhancing the anti-interference ability of one of two users multiplexing the same OTFS symbol and adjacent in delay-Doppler resource, so as to improve the success probability of decoding of the receiving terminal for users (having priority for decoding), and then remove the interference caused by successfully decoded users by iterative serial de-interference receiver, and decode other users, thereby improving system performance.

Second Embodiment

Figure 3:
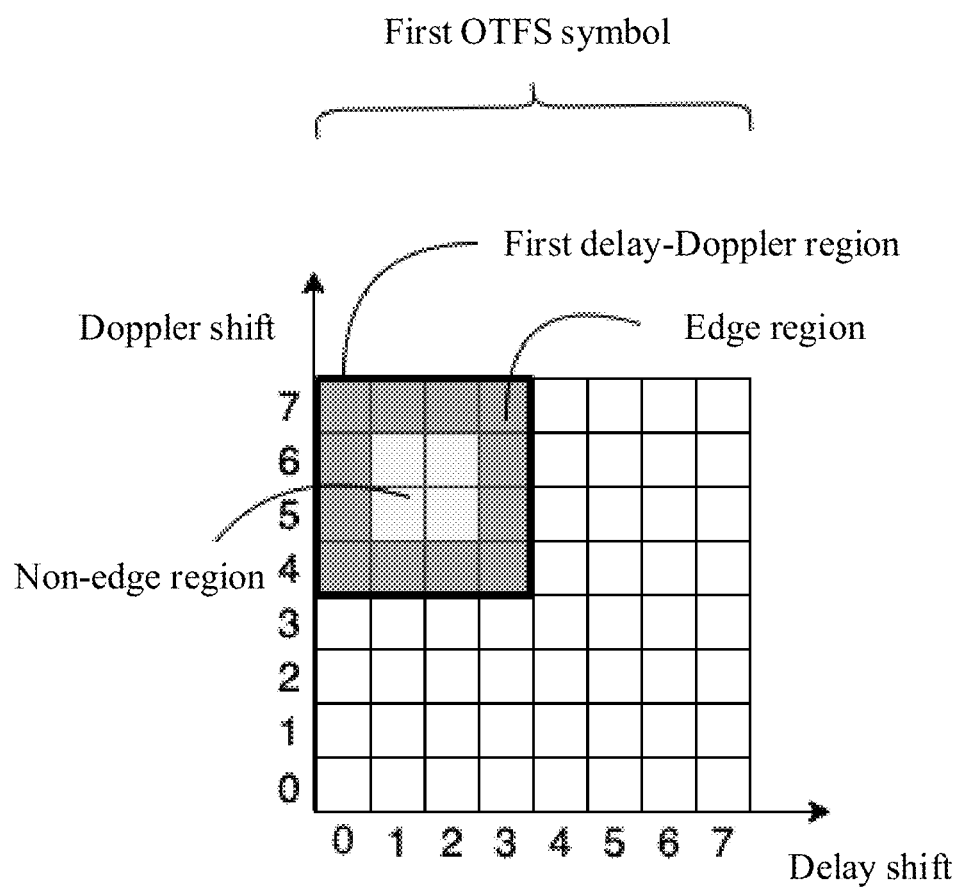
FIG. 3 is a schematic diagram of a first OTFS symbol, a first delay-Doppler region, an edge region and a non-edge region according to an embodiment of the disclosure.

FIG. 3 is a schematic diagram of a first OTFS symbol, a first delay-Doppler region, an edge region and a non-edge region according to an embodiment of the disclosure. In this embodiment, as shown in FIG. 3, the first OTFS symbol occupies 8 delay shifts in the delay dimension and 8 Doppler shifts in the Doppler dimension, including a total of 64 delay-Doppler resource elements. The first delay-Doppler region is a region with a delay shift of 0) to 3 and a Doppler shift of 4 to 7. The dark gray grids are delay-Doppler resource elements on the edge region in the first delay-Doppler region. The light gray grids are delay-Doppler resource elements on the non-edge region in the first delay-Doppler region.

The first transmitting terminal sets the average signal power of the edge region to be different from the average signal power of the non-edge region, places data symbols and pilot symbols modulated by QAM on delay-Doppler resource elements in the first delay-Doppler region; adjusts the average signal power of the edge region and the average signal power of the non-edge region based on different average signal power settings; and generates and transmits the first OTFS symbol.

Exemplary, the average signal power of the edge region is set to be smaller than the average signal power of the non-edge region.

Exemplary, the average signal power of the edge region is set to be larger than the average signal power of the non-edge region.

Exemplary, the average signal power of the edge region on the delay shift dimension and the average signal power of the edge region on the Doppler shift dimension are set to be identical.

Exemplary, the average signal power of the edge region on the delay shift dimension is set to be different from the average signal power of the edge region on the Doppler shift dimension.

Exemplary, no data or no pilot signals are placed on the delay-Doppler regions other than the first delay-Doppler region.

Third Embodiment

Figure 4:
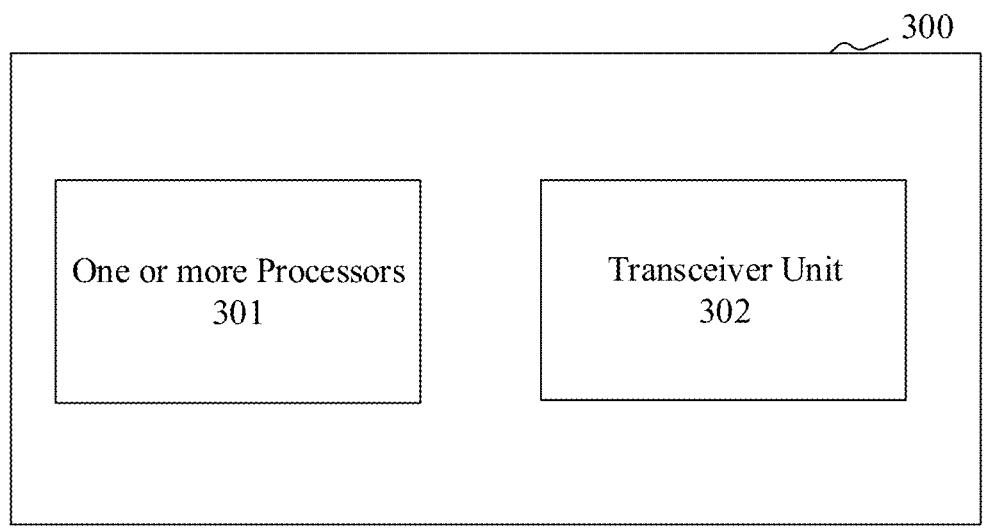
FIG. 4 is a structural block diagram of a device for wireless communication according to an embodiment of the disclosure.

FIG. 4 is a structural block diagram illustrating a device 300 for wireless communication according to an embodiment of the disclosure. The device 300 includes a transceiver unit and one or more processors. The transceiver unit is configured to receive a first OTFS symbol. The one or more processors are configured to: demodulate the first OTFS symbol; divide a delay-Doppler resource occupied by the first OTFS symbol into M delay-Doppler regions. K delay-Doppler regions of the M delay-Doppler regions are respectively used for placing data or pilot signals by K transmitting terminals, a first delay-Doppler region is one of the K delay-Doppler regions, the first delay-Doppler region is used for placing data or pilot signals by a first transmitting terminal. M and K are natural numbers not less than 1, and M is not less than K; and decode a data signal on the first OTFS symbol, the first delay-Doppler region comprises an edge region and a non-edge region in a delay shift dimension and a Doppler shift dimension, and the average signal power of the edge region is different from the average signal power of the non-edge region.

In this embodiment and the following embodiments, the device 300 may be implemented as a base station. The base station may include a body (also referred to as a base station module) configured to control wireless communication; and one or more Remote Radio Heads (RRH) arranged at a different place from the body. In addition, various types of terminal device may operate as a base station by temporarily or semi-persistently performing the functions of the base station. In addition, the device 300 may also be implemented as any type of server, such as a tower server, a rack server, and a blade server. The device 300 may be a control module (such as an integrated circuit module including a single wafer, and a card or blade inserted into a slot of a blade server) mounted on a server. For example, the communication system where the device 300 is located applies C-RAN technology. The device 300 can be implemented as a server set in the core network or baseband cloud. The device 300 receives signals for processing based on antennas or antenna arrays of RRH within its management range, the RRH within its management range includes a transceiver unit 302, and the server where the device 300 is located includes one or more processors 301. The transceiver unit 302 is configured to receive a first OTFS symbol. The one or more processors 301 are configured to: demodulate the first OTFS symbol; divide a delay-Doppler resource occupied by the first OTFS symbol into M delay-Doppler regions, K delay-Doppler regions of the M delay-Doppler regions are respectively used for placing data or pilot signals by K transmitting terminals, a first delay-Doppler region is one of the K delay-Doppler regions, the first delay-Doppler region is used for placing data or pilot signals by a first transmitting terminal, M and K are natural numbers not less than 1, and M is not less than K; and decode a data signal on the first OTFS symbol, the first delay-Doppler region includes an edge region and a non-edge region in a delay shift dimension and a Doppler shift dimension, and the average signal power of the edge region is different from the average signal power of the non-edge region. In the following description, the device 300 is mainly implemented as a base station as an example and it is understood that the scope of the disclosure is not limited thereto.

The communication device served by the base station may be implemented as a user equipment, such as a mobile terminal served by the base station (such as a smart phone, a tablet personal computer (PC), a notebook PC, a portable game terminal, a portable/dongle mobile router and a digital camera device) or a vehicle-mounted terminal (such as a car navigation device), etc. The user equipment may also be implemented as a terminal performing M2M communication (also referred to as a MTC terminal). Further, the user equipment may be a wireless communication module (such as an integrated circuit module including a single wafer) installed on each of the above terminals.

In addition, in some alternative examples, the communication device served/managed by the base station may be implemented as an infrastructure such as a relay base station, a small eNB or the like that needs to communicate with the base station through a wireless interface and to perform channel measurement. In the following description, a user equipment is mainly described as an example and it is understood that the scope of the disclosure is not limited thereto.

The processor 301 may be for example a central processing unit (CPU), a microprocessor, an integrated circuit module or the like with data processing capability.

Figure 5:
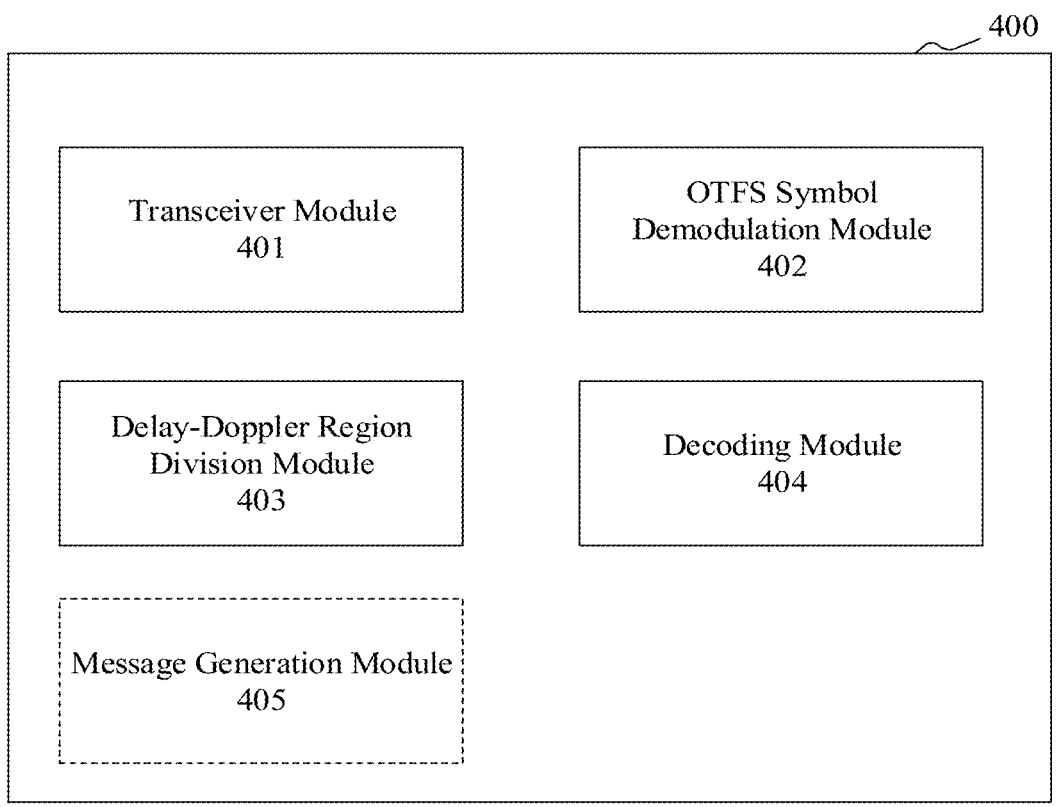
FIG. 5 is a structural block diagram of a specific implementation of a device for wireless communication according to an embodiment of the disclosure.

Accordingly, FIG. 5 is a structural block diagram illustrating a specific implementation of the device 400 (denoted in FIG. 5 as device 400), and the function and structure of the device 400 will be described in detail below with reference to this block diagram. As shown in FIG. 5 the device 400 includes a transceiver module 401, an OTFS symbol demodulation module 402, a delay-Doppler region division module 403 and a decoding module 404. The transceiver module 401 is configured to receive a first OTFS symbol. The OTFS symbol demodulation module 402 is configured to demodulate the first OTFS symbol. The delay-Doppler region division module 403 is configured to divide a delay-Doppler resource occupied by the first OTFS symbol into M delay-Doppler regions. K delay-Doppler regions of the M delay-Doppler regions are respectively used for placing data or pilot signals by K transmitting terminals, a first delay-Doppler region is one of the K delay-Doppler regions, the first delay-Doppler region is used for placing data or pilot signals by a first transmitting terminal, M and K are natural numbers not less than 1, and M is not less than K. The decoding module 404 is configured to decode a data signal on the first OTFS symbol, the first delay-Doppler region includes an edge region and a non-edge region in a delay shift dimension and a Doppler shift dimension, and the average signal power of the edge region is different from the average signal power of the non-edge region.

In an example, the decoding module 404 is configured to decode the data of the K transmitting terminals on the first OTFS symbol by using iterative serial de-interference receiver(s) in the delay shift dimension and the Doppler shift dimension.

In an example, the device 400 includes a message generation module 405 configured to generate a first message, the first message is used by the first transmitting terminal to determine the edge region and the non-edge region. The transceiver module 401 is configured to transmit the first message.

In an example, the device 400 includes a message generation module 405 configured to generate a second message, the second message is used by the first transmitting terminal to determine a difference between the average signal power of the edge region and the average signal power of the non-edge region. The transceiver module 401 is configured to transmit the second message.

To sum up, the device 300 and the device 400 can take advantage of the different powers of the edge region and the non-edge region in the delay-Doppler region occupied by the transmitting terminal, the users with relatively low interference are decoded with priority, and then the interference caused by successfully decoded users is removed by iterative serial de-interference receiver, and remaining users are decoded, thereby improving system performance.

Fourth Embodiment

Figure 6:
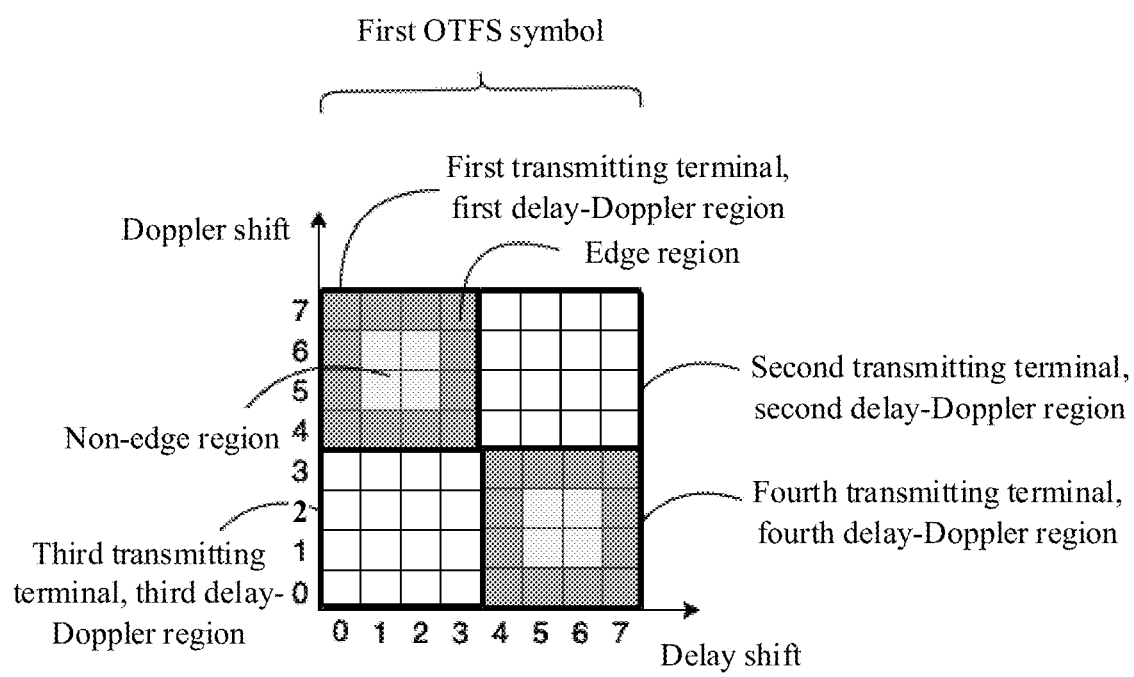
FIG. 6 is a schematic diagram of multiple transmitting terminals multiplex the first OTFS symbol according to an embodiment of the disclosure.

FIG. 6 is a schematic diagram of multiple transmitting terminals multiplex the first OTFS symbol according to an embodiment of the disclosure. In this embodiment, as shown in FIG. 6, the first OTFS symbol occupies 8 delay shifts in delay dimension and 8 Doppler shifts in Doppler dimension, including a total of 64 delay-Doppler resource elements, where the first delay-Doppler region is allocated to the first transmitting terminal to transmit data and pilot signal, the second delay-Doppler region is allocated to the second transmitting terminal to transmit data and pilot signal, the third delay-Doppler region is allocated to the third transmitting terminal to transmit data and pilot signal, and the fourth delay-Doppler region is allocated to the fourth transmitting terminal to transmit data and pilot signal. The first delay-Doppler region is a region with a delay shift of 0 to 3 and a Doppler shift of 4 to 7. The second delay-Doppler region is a region with a delay shift of 4 to 7 and a Doppler shift of 4 to 7. The third delay-Doppler region is a region with a delay shift of 0 to 3 and a Doppler shift of 0 to 3. The fourth delay-Doppler region is a region with a delay shift of 4 to 7 and a Doppler shift of 0 to 3. The dark gray grids in the first delay-Doppler region and the fourth delay-Doppler region are delay-Doppler resource elements on their respective edge region. The light gray grids in the first delay-Doppler region and the fourth delay-Doppler region are delay-Doppler resource elements on their respective non-edge region.

The signal average transmitting powers respectively allocated by the first transmitting terminal and the fourth transmitting terminal on the edge regions are different from the signal average transmitting powers on the non-edge regions. The signal average transmitting powers respectively allocated by the second transmitting terminal and the third transmitting terminal on the edge regions are the same as the signal average transmitting powers on the non-edge regions.

Exemplary, the signal average transmitting powers allocated respectively by the first transmitting terminal and the fourth transmitting terminal on the edge regions are larger than the signal average transmitting powers on the non-edge regions and larger than the signal average transmitting powers of the second transmitting terminal and the third transmitting terminal. The receiving terminal firstly decodes the data of the first transmitting terminal and the fourth transmitting terminal by using an iterative serial de-interference receiver. If the data of the first transmitting terminal and the fourth transmitting terminal are successfully decoded, the interference caused by the first transmitting terminal and the fourth transmitting terminal is removed from the received signal based on the result of successful decoding, and then the data from the second transmitting terminal and the third transmitting terminal are decoded.

Exemplary, the signal average transmitting powers allocated respectively by the first transmitting terminal and the fourth transmitting terminal on the edge regions are smaller than the signal average transmitting powers on the non-edge regions and smaller than the signal average transmitting powers of the second transmitting terminal and the third transmitting terminal. The receiving terminal firstly decodes the data of the second transmitting terminal and the third transmitting terminal by using an iterative serial de-interference receiver. If the data of the second transmitting terminal and the third transmitting terminal are successfully decoded, the interference caused by the second transmitting terminal and the third transmitting terminal is removed from the received signal based on the result of successful decoding, and then the data from the first transmitting terminal and the fourth transmitting terminal are decoded.

Fifth Embodiment

In the process of describing the device for wireless communication in the above embodiments, the processes or methods are also apparently disclosed. Hereinafter, a summary of these methods is given without repeating some of the details already discussed above, but it should be noted that although these methods are disclosed in the process of describing the device for wireless communication, these methods do not necessarily use those components described or do not necessarily be performed by those components. For example, embodiments of the device for wireless communication may be implemented partially or entirely by using hardware and/or firmware, while the methods for wireless communication discussed below may be implemented entirely by computer-executable programs, although these methods may also employ hardware and/or firmware of the device for wireless communication.

Figure 7:
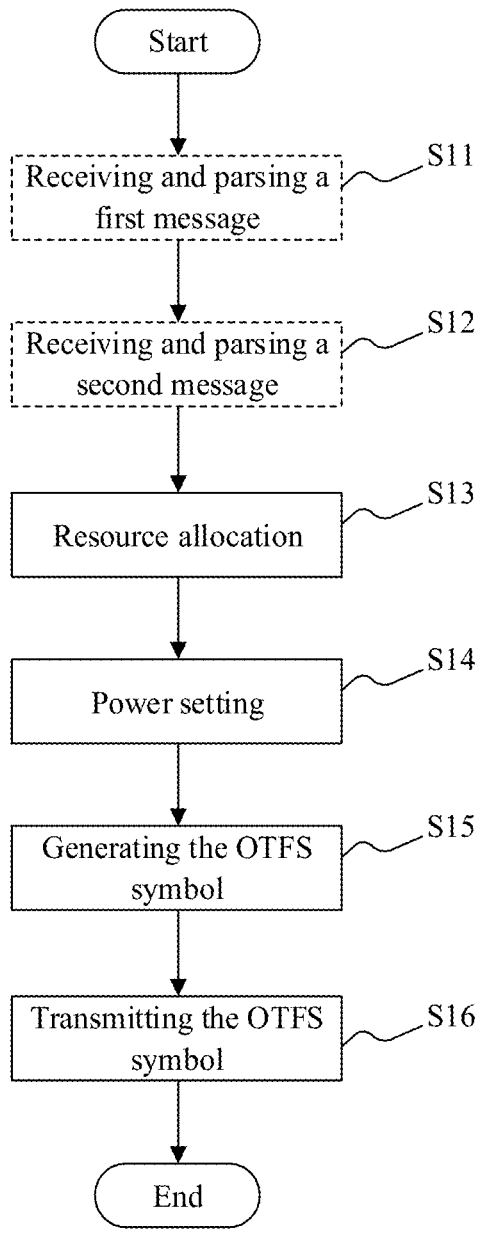
FIG. 7 is a flowchart of a method for wireless communication according to an embodiment of the disclosure.

FIG. 7 is a flowchart of a method for wireless communication according to an embodiment of the disclosure, including the following operations; a delay-Doppler resource occupied by a first OTFS symbol is divided into M delay-Doppler regions, a first delay-Doppler region is one of the M delay-Doppler regions, and M is a natural number not less than 1 (operation S13); the first delay-Doppler region is divided into an edge region and a non-edge region in a delay shift dimension and a Doppler shift dimension, and the average signal power of the edge region is set to be different from the average signal power of the non-edge region (operation S14); the first OTFS symbol is generated (operation S15); and the first OTFS symbol is transmitted (operation S16).

Exemplary, the method for wireless communication further includes receiving and parsing a first message (operation S11) indicated by a dashed box, the first message is used for determining the edge region and the non-edge region.

Exemplary, the method for wireless communication further includes receiving and parsing a second message (operation S12) indicated by a dashed box, the second message is used for determining a difference between the average signal power of the edge region and the average signal power of the non-edge region.

Exemplary, in operation S13, no data or no pilot signals are placed on M−1 delay-Doppler regions (other than the first delay-Doppler region) of the M delay-Doppler regions, and M is a natural number greater than 1.

Exemplary, in operation S14, the average signal power of the edge region is set to be smaller than the average signal power of the non-edge region.

Exemplary, in operation S14, the average signal power of the edge region is set to be larger than the average signal power of the non-edge region.

Exemplary, in operation S14, the average signal power of the edge region on the delay shift dimension is set to be identical to the average signal power of the edge region on the Doppler shift dimension.

Exemplary, in operation S14, the average signal power of the edge region on the delay shift dimension is set to be different from the average signal power of the edge region on the Doppler shift dimension.

Figure 8:
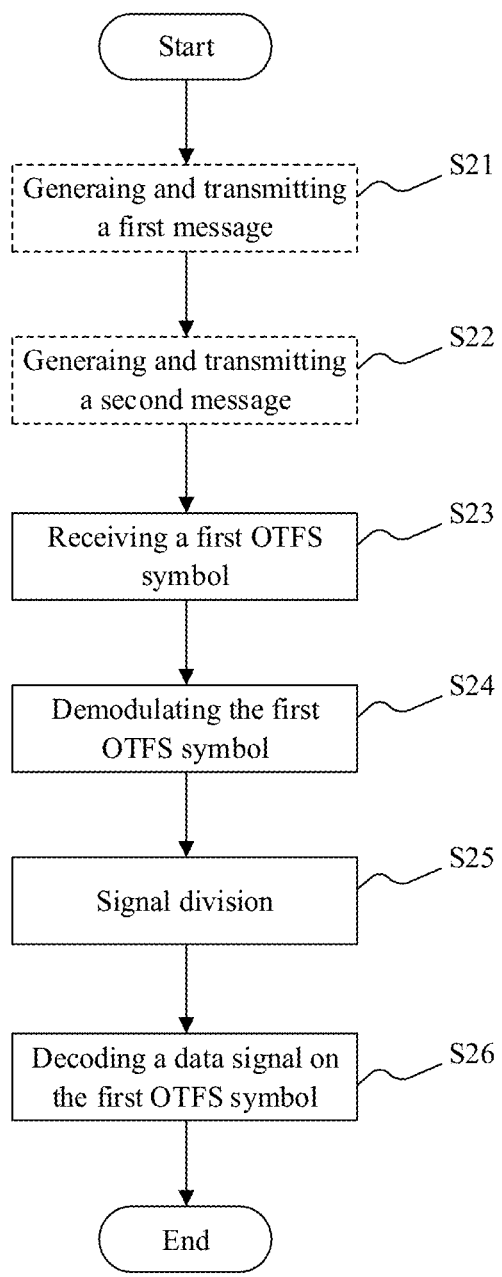
FIG. 8 is a flowchart of a method for wireless communication according to an embodiment of the disclosure.

FIG. 8 is a flowchart of a method for wireless communication according to another embodiment of the disclosure, including the following operations: a first OTFS symbol is received (operation S23); the first OTFS symbol is demodulated (operation S24); a delay-Doppler resource occupied by the first OTFS symbol is divided into M delay-Doppler regions, K delay-Doppler regions of the M delay-Doppler regions are respectively used for placing data or pilot signals by K transmitting terminals, a first delay-Doppler region is one of the K delay-Doppler regions, the first delay-Doppler region is used for placing data or pilot signals by a first transmitting terminal, M and K are natural numbers not less than 1, and M is not less than K (operation S25); and a data signal on the first OTFS symbol is decoded, the first delay-Doppler region comprises an edge region and a non-edge region in a delay shift dimension and a Doppler shift dimension, and the average signal power of the edge region is different from the average signal power of the non-edge region (operation S26).

Exemplary, in operation S26, the data of the K transmitting terminals on the first OTFS symbol are decoded by using iterative serial de-interference decoding in the delay shift dimension and the Doppler shift dimension.

Exemplary, the method for wireless communication further includes generating and transmitting a first message (operation S21) indicated by a dashed box, the first message is used for determining the edge region and the non-edge region.

Exemplary, the method for wireless communication further includes generating and transmitting a second message (operation S22) indicated by a dashed box, the second message is used for determining a difference between the average signal power of the edge region and the average signal power of the non-edge region.

Note that the various methods described above may be used in combination or alone, the details of which have been described in detail in the first embodiment, the second embodiment, the third embodiment and the fourth embodiment and will not be repeated here.

Sixth Embodiment

An example of a base station applying the technology of the disclosure will be given in this embodiment.

First Application Example

Figure 9:
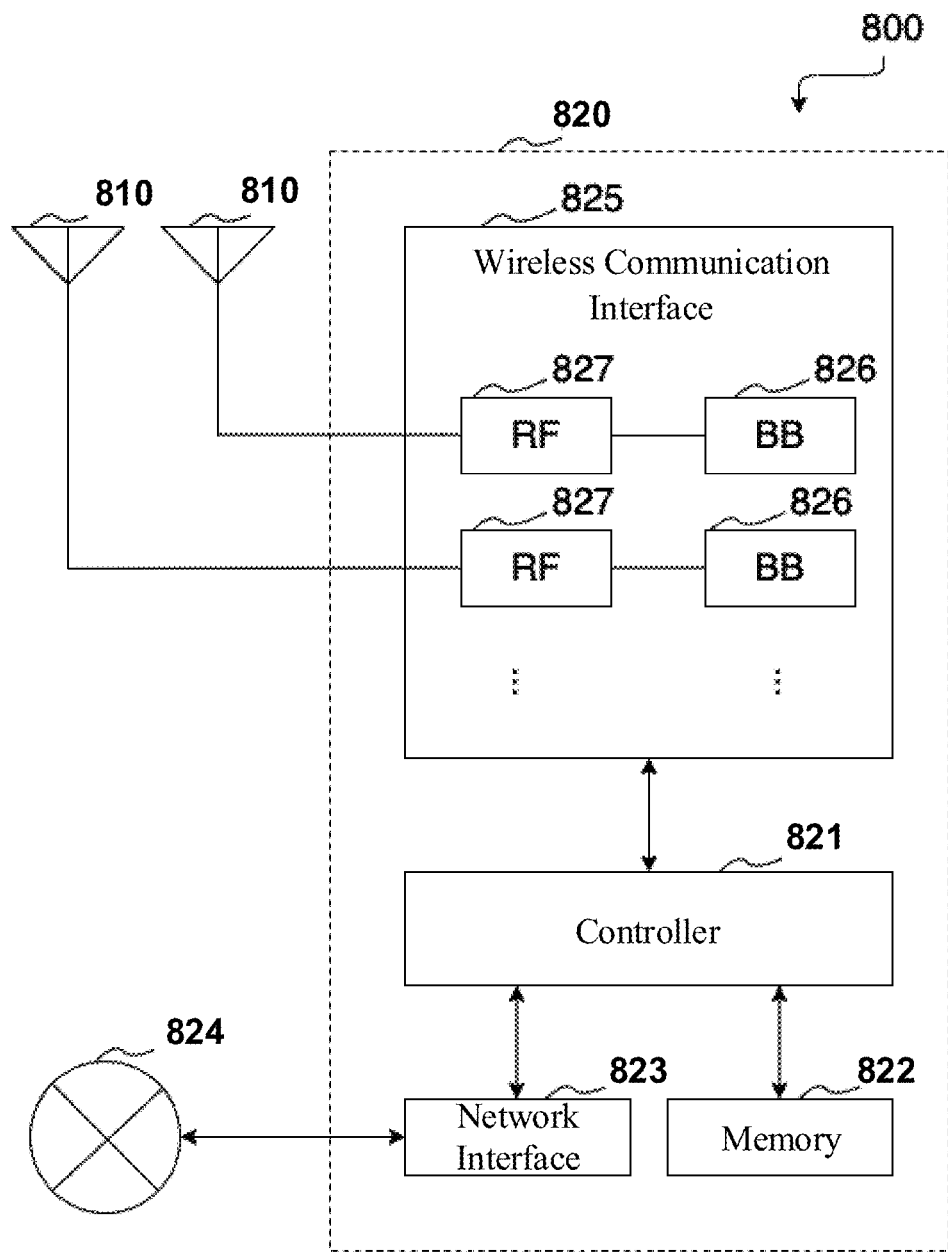
FIG. 9 is a block diagram illustrating a first example of a schematic configuration of a base station.

FIG. 9 is a block diagram illustrating a first example of a schematic configuration of a base station to which the technology of the disclosure can be applied. The base station 800 includes one or more antennas 810 and a base station module 820. The base station module 820 and each of the antennas 810 may be linked to each other via an RF cable.

Each of the antennas 810 includes a single or multiple antenna elements (such as multiple antenna elements included in a multiple-input multiple-output (MIMO) antenna), and is used for the base station module 820 to transmit and receive wireless signal. As shown in FIG. 9, the base station 800 includes multiple antennas 810. For example, the multiple antennas 810 may be compatible with the multiple bands used by the base station 800. Although FIG. 9 illustrates an example in which the base station 800 includes multiple antennas 810, the base station 800 may also include a single antenna 810.

The base station module 820 includes a controller 821, a memory 822, a network interface 823, and a wireless communication interface 825.

The controller 821 may be for example a Central Processing Unit (CPU) or a Digital Signal Processing (DSP) and operates various functions of a higher layer of the base station module 820. For example, the controller 821 generates data packets from data in signals processed by the wireless communication interface 825 and transfers the generated packets via the network interface 823. The controller 821 may bundle data from the multiple baseband processors to generate bundled packets and transfer the generated bundled packets. The controller 821 may have a logical function to perform controls, such as radio resource control, radio bearer control, mobility management, admission control and scheduling. The control can be performed in conjunction with neighboring base stations or core network nodes. The memory 822 includes a RAM and a ROM, and stores programs executed by the controller 821 and various types of control data (such as a terminal list, transmission power data, and scheduling data).

The network interface 823 is a communication interface for connecting the base station module 820 to a core network 824. The controller 821 may communicate with a core network node or another base station via the network interface 823. In this case, the base station 800 and the core network node or another base station may be connected to each other via logical interfaces, such as the SI interface and the X2 interface. The network interface 823 may also be a wired communication interface or a wireless communication interface for a wireless backhaul line. If the network interface 823 is a wireless communication interface, the network interface 823 may use a higher band for wireless communication compared with the band used by the wireless communication interface 825.

The wireless communication interface 825 supports any cellular communication scheme, such as Long Term Evolution (LTE), LTE-advanced and 5G, and provides a wireless connection to terminal(s) located in a cell of the base station 800 via the antenna 810. The wireless communication interface 825 may generally include, for example, a baseband (BB) processor 826 and a RF circuit 827. The BB processor 826 may perform, for example, encoding/decoding, modulation/demodulation, and multiplexing/demultiplexing, and perform various types of signal processing of layers (e.g. L1, Media Access Control (MAC), Radio Link Control (RLC), and Packet Data Convergence Protocol (PDCP)). Instead of the controller 821, the BB processor 826 may have some or all of the logic functions described above. The BB processor 826 may be a memory storing a communication control program or a module including a processor and related circuits configured to execute the program. The update program may change the function of the BB processor 826. The module may be a card or a blade inserted into a slot of the base station module 820. Alternatively, the module may also be a chip mounted on a card or a blade. Meanwhile, the RF circuit 827 may include for example mixers, filters, and amplifiers, and transmits and receives wireless signals via the antenna 810.

As shown in FIG. 9, the wireless communication interface 825 may include multiple BB processors 826. For example, the multiple BB processors 826 may be compatible with the multiple bands used by the base station 800. As shown in FIG. 5, the wireless communication interface 825 may include multiple RF circuits 827. For example, the multiple RF circuits 827 may be compatible with multiple antenna elements. Although FIG. 5 illustrates an example in which the wireless communication interface 825 includes multiple BB processors 826 and multiple RF circuits 827, the wireless communication interface 825 may also include a single BB processor 826 or a single RF circuit 827.

Second Application Example

Figure 10:
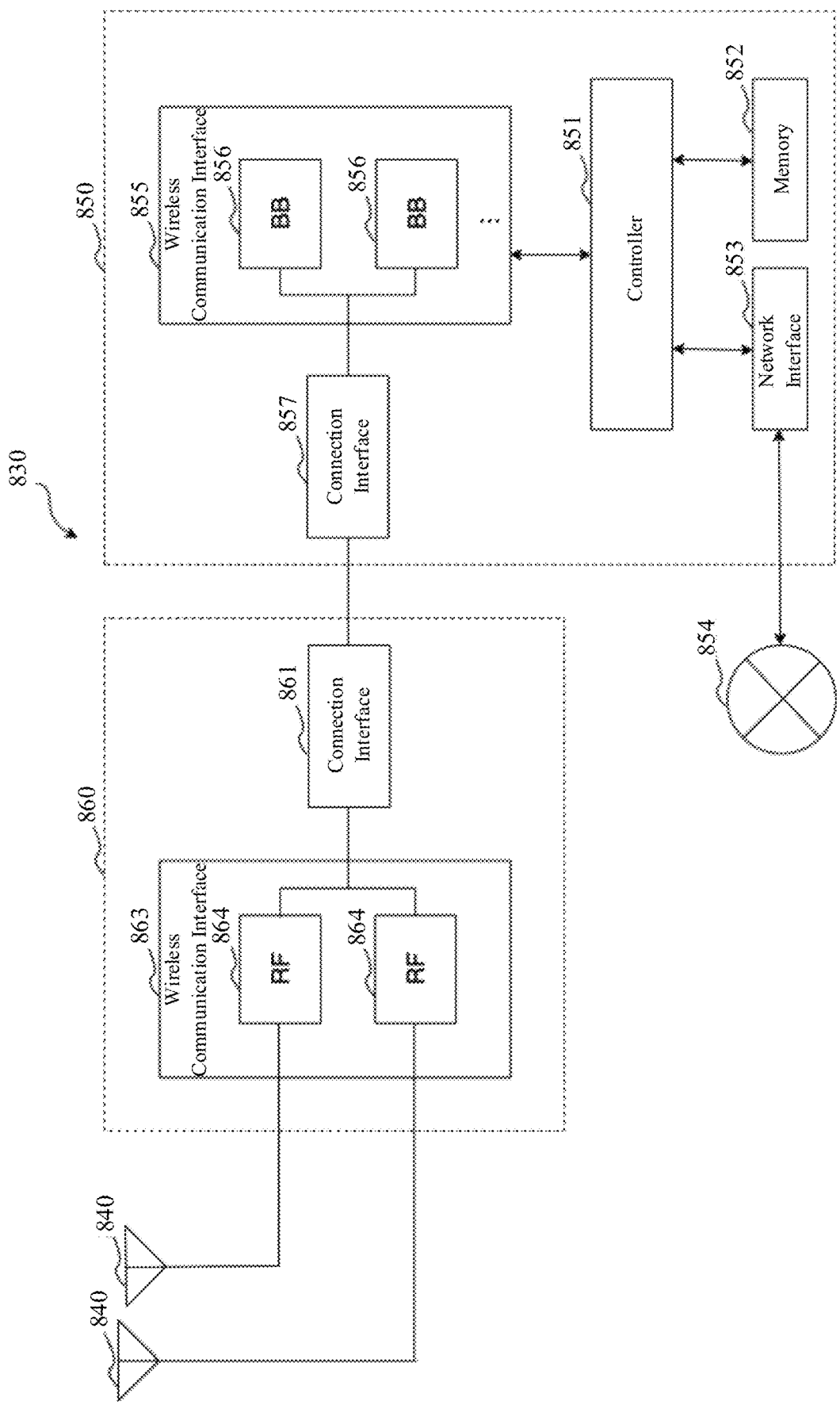
FIG. 10 is a block diagram illustrating a second example of a schematic configuration of a base station.

FIG. 10 is a block diagram illustrating a second example of a schematic configuration of a base station to which the technology of the disclosure can be applied. The base station 830 includes one or more antennas 840, a base station module 850 and an RRH 860. The RRH 860 and each of the antennas 840 may be linked to each other via an RF cable. The base station module 850 and the RRH 860 may be connected to each other via a high-speed line such as a fiber optic cable.

Each of the antennas 840 includes a single or multiple antenna elements (such as multiple antenna elements included in a MIMO antenna) and is used for the RRH 860 to transmit and receive wireless signal. As shown in FIG. 10, the base station 830 may include multiple antennas 840. For example, the multiple antennas 840 may be compatible with the multiple bands used by the base station 830. Although FIG. 10 illustrates an example in which the base station 830 includes multiple antennas 840, the base station 830 may also include a single antenna 840.

The base station module 850 includes a controller 851, a memory 852, a network interface 853, a wireless communication interface 855, and a connection interface 857. The controller 851, the memory 852 and the network interface 853 are the same as the controller 821, the memory 822 and the network interface 823 described with reference to FIG. 5.

The wireless communication interface 855 supports any cellular communication scheme, such as Long Term Evolution (LTE), LTE-advanced, and 5G, and provides wireless communication to terminals located in sector corresponding to an RRH 860 via the RRH 860 and an antenna 840. The wireless communication interface 855 may generally include, for example, a BB processor 856. The BB processor 856 is the same as the BB processor 826 described with reference to FIG. 5 except that the BB processor 856 is connected to an RF circuit 864 of the RRH 860 via the connection interface 857. As shown in FIG. 10, the wireless communication interface 855 may include multiple BB processors 856. For example, the multiple BB processors may be compatible with the multiple bands used by the base station 830. While FIG. 10 illustrates an example in which the wireless communication interface 855 includes multiple BB processors 856, the wireless communication interface 855 may also include a single BB processor 856.

The connection interface 857 is an interface for connecting the base station module 850) (the wireless communication interface 855) to the RRH 860. The connection interface 857 may also be a communication module for communication (in the above-described high-speed line) connecting the base station module 850 (the wireless communication interface 855) to the RRH 860.

The RRH 860 includes a connection interface 861 and a wireless communication interface 863.

The connection interface 861 is an interface for connecting the RRH 860 (the wireless communication interface 863) to the base station module 850. The connection interface 861 may also be a communication module for communication in the above-mentioned high-speed line.

The wireless communication interface 863 transmits and receives wireless signals via the antenna 840. The wireless communication interface 863 may generally include, for example, a RF circuit 864. The RF circuit 864 may include for example mixers, filters, and amplifiers, and transmit and receive wireless signals via the antenna 840. As shown in FIG. 10, the wireless communication interface 863 may include multiple RF circuits 864. For example, the multiple RF circuits 864 may support multiple antenna elements. Although FIG. 10 illustrates an example in which the wireless communication interface 863 includes the multiple RF circuits 864, the wireless communication interface 863 may also include a single RF circuit 864.

In the base station 800 and the base station 830 shown in FIG. 9 and FIG. 10, such as the transceiver unit 301, the transceiver module 404 described in FIG. 4 and FIG. 5 may be implemented by the wireless communication interface 825 and the wireless communication interface 855 and/or the wireless communication interface 863. At least a portion of the functions may also be implemented by the controller 821 and the controller 851. For example, the controller 821 and the controller 851 may demodulate of the first OTFS symbol, divide the delay-Doppler region, perform decoding based on different average signal powers of the edge region and the non-edge region, and generate the first message or the second message by performing the functions of the OTFS symbol demodulation module 402, the delay-Doppler region division module 403, the decoding module 404, and the message generation module 405.

Seventh Embodiment

An example of a user equipment to which the technology of the disclosure is applied will be given in this embodiment.

First Application Example

Figure 11:
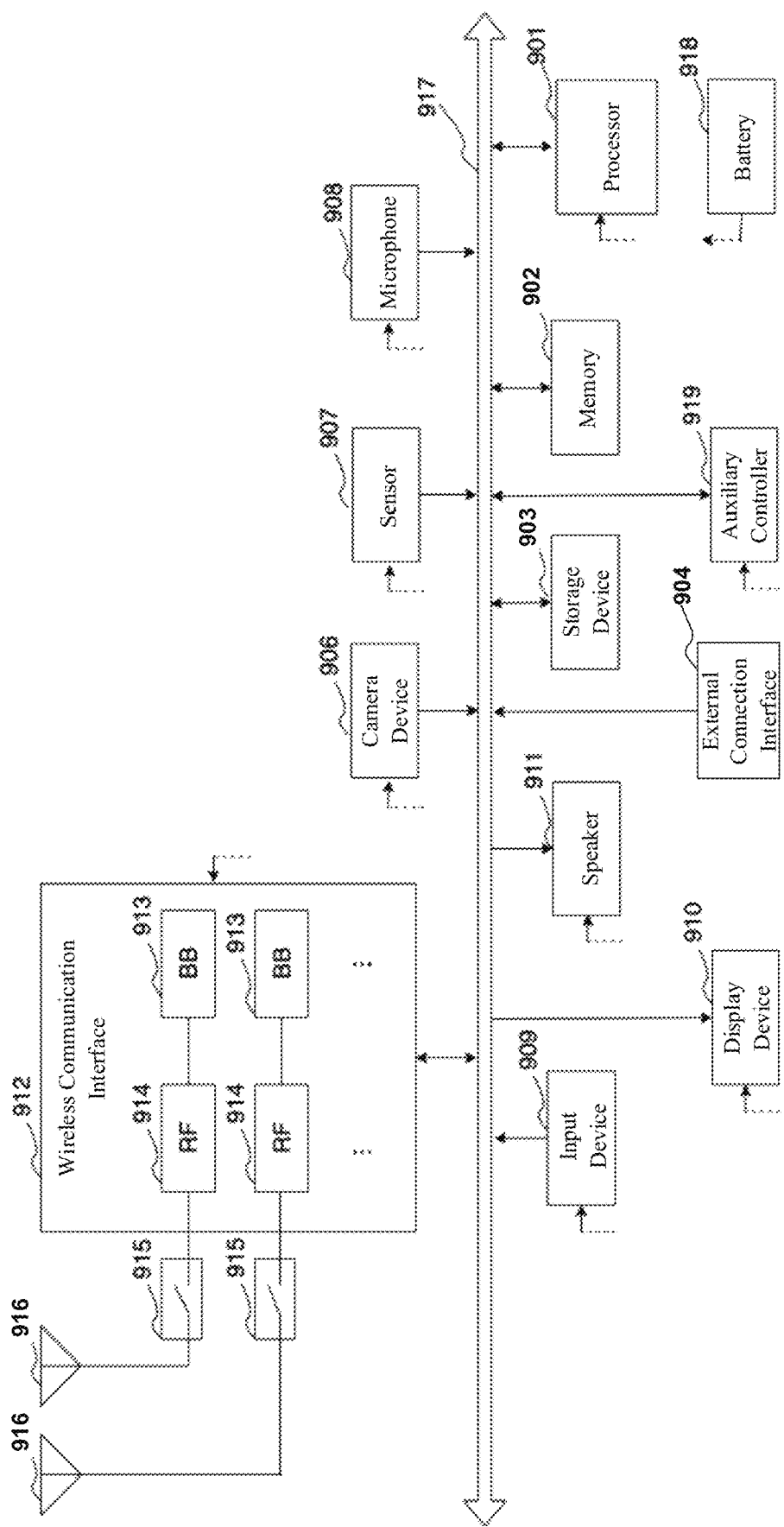
FIG. 11 is a block diagram illustrating an example of a schematic configuration of a first application example of a user equipment.

FIG. 11 is a block diagram illustrating an example of a schematic configuration of a smart phone 900 to which the technology of the disclosure can be applied. The smart phone 900 includes a processor 901, a memory 902, a storage device 903, an external connection interface 904, a camera device 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be for example a CPU or a system-on-chip (SoC) and controls the functions of the application layer and other layers of the smart phone 900. The memory 902 includes a RAM and a ROM, and stores data and programs executed by the processor 901. The storage device 903 may include storage media, such as semiconductor memory and hard disk. The external connection interface 904 is an interface for connecting an external device (such as a memory card and a universal serial bus (USB) device) to the smart phone 900.

The camera device 906 includes an image sensor (such as charge coupled devices (CCD) and complementary metal oxide semiconductors (CMOS)) and generates a captured image. The sensor 907 may include a set of sensors, such as a measurement sensor, a gyroscope sensor, a geomagnetic sensor, and an acceleration sensor. The microphone 908 converts the sound input to the smart phone 900 into an audio signal. The input device 909 includes, for example, a touch sensor configured to detect a touch on a screen of the display device 910, a keypad, a keyboard, a button, or a switch, and accepts an operation or information input from a user. The display device 910 includes a screen (such as a liquid crystal display (LCD) and an organic light emitting diode (OLED) display) and displays an output image of the smart phone 900. The speaker 911 converts the audio signal output from the smart phone 900 into sound.

The wireless communication interface 912 supports any cellular communication scheme (such as LTE, LTE-advanced and 5G) and performs wireless communication. The wireless communication interface 912 may generally include, for example, a BB processor 913 and an RF circuit 914. The BB processor 913 may perform, for example, encoding/decoding, modulation/demodulation, and multiplexing/demultiplexing, and perform various types of signal processing for wireless communication. Meanwhile, the RF circuit 915 may include for example mixers, filters, and amplifiers, and transmits and receives wireless signals via the antenna 916. The wireless communication interface 912 may be a chip module on which the BB processor 913 and the RF circuit 914 are integrated. As shown in FIG. 11, the wireless communication interface 912 may include multiple BB processors 913 and multiple RF circuits 914. While FIG. 11 illustrates an example in which the wireless communication interface 912 includes multiple BB processors 913 and multiple RF circuits 914, the wireless communication interface 912 may also include a single BB processor 913 or a single RF circuit 914.

In addition, the wireless communication interface 912 may support other types of wireless communication schemes, such as a short-range wireless communication scheme, a near-field communication scheme and a wireless local area network (WLAN) scheme in addition to a cellular communication scheme. In this case, the wireless communication interface 912 may include BB processors 913 and RF circuits 914 for each wireless communication scheme.

Each of the antenna switches 915 switches the connection destination of the antennas 916 between multiple circuits (e.g. circuits for different wireless communication schemes) included in the wireless communication interface 912.

Each of the antennas 916 includes a single or multiple antenna elements (such as multiple antenna elements included in a MIMO antenna) and is used for wireless communication interface 912 to transmit and receive wireless signals. As shown in FIG. 11, the smart phone 900 may include multiple antennas 916. Although FIG. 11 illustrates an example in which the smart phone 900 includes multiple antennas 916, the smart phone 900 may also include a single antenna 916.

In addition, the smart phone 900 may include antennas 916 for each wireless communication scheme. In this case, the antenna switch 915 may be omitted from the configuration of the smart phone 900.

The bus 917 connects the processor 901, the memory 902, the storage device 903, the external connection interface 904, the camera device 906, the sensor 907, the microphone 908, the input device 909, the display device 901, the speaker 911, the wireless communication interface 912, and the auxiliary controller 919 to each other. The battery 918 supplies power to the individual blocks of the smart phone 900 illustrated in FIG. 11 via feeder lines which are partially shown as dashed lines in the figure. The auxiliary controller 919 operates, for example in a sleep mode, the minimal required functionality of the smart phone 900.

In the smart phone 900 shown in FIG. 11, the transceiver unit 102, the transceiver module 204 for example described in FIG. 1 and FIG. 2 may be implemented by a wireless communication interface 912. At least a portion of the functions may also be implemented by the processor 901 or the auxiliary controller 919. For example, the processor 901 or the auxiliary controller 919 may divide the delay-Doppler region, set different average signal powers for the edge region and the non-edge region of the first delay-Doppler region, generate the first OTFS symbol, and parse the first message or the second message by performing the functions of the resource allocation module 201, the power setting module 202, the OTFS symbol generation module 203, the transceiver module 204, and the message parsing module 205.

Second Application Example

Figure 12:
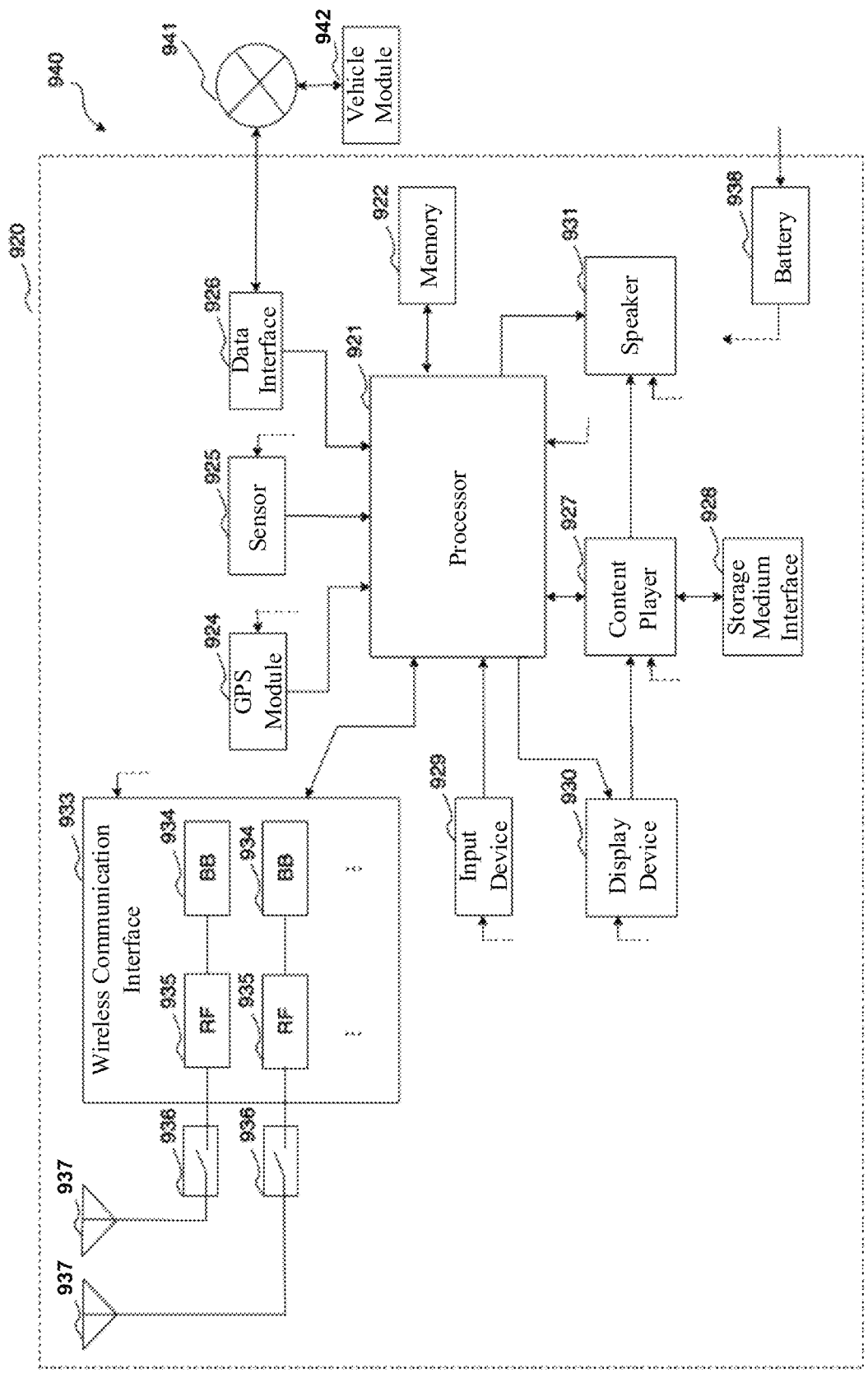
FIG. 12 is a block diagram illustrating an example of a schematic configuration of a second application example of a user equipment.

FIG. 12 is a block diagram illustrating an example of a schematic configuration of a car navigation device 920 to which the technology of the disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be for example a CPU or a system-on-chip (SoC) and controls navigation function and additional functions of the car navigation device 920. The memory 922 includes a RAM and a ROM, and stores data and programs executed by the processor 921.

The GPS module 924 uses GPS signals received from GPS satellites to measure the position (such as latitude, longitude and altitude) of the car navigation device 920. The sensor 925 may include a set of sensors, such as a gyroscope sensor, a geomagnetic sensor, and an air pressure sensor. The data interface 926 is connected to for example an in-vehicle network 941 via a terminal not shown, and acquires data (such as vehicle speed data) generated by the vehicle.

The content player 927 reproduces content stored in a storage medium (such as a CD and a DVD) which is inserted into the storage medium interface 928. The input device 929 includes, for example, a touch sensor configured to detect a touch on a screen of the display device 930, a button, or a switch, and receives an operation or information input from a user. The display device 930 includes a screen such as an LCD or an OLED display, and displays the image of the navigation function or the reproduced content. The speaker 931 outputs the sound of the navigation function or the reproduced content.

The wireless communication interface 933 supports any cellular communication scheme (such as LTE, LTE-advanced and 5G) and performs wireless communication. The wireless communication interface 912 may generally include, for example, a BB processor 934 and an RF circuit 935. The BB processor 934 may perform, for example, encoding/decoding, modulation/demodulation, and multiplexing/demultiplexing, and perform various types of signal processing for wireless communication. Meanwhile, the RF circuit 935 may include for example mixers, filters, and amplifiers, and transmits and receives wireless signals via the antenna 937. The wireless communication interface 933 may be a chip module on which the BB processor 934 and the RF circuit 935 are integrated. As shown in FIG. 12, the wireless communication interface 933 may include multiple BB processors 934 and multiple RF circuits 935. While FIG. 12 illustrates an example in which the wireless communication interface 933 includes multiple BB processors 934 and multiple RF circuits 935, the wireless communication interface 933 may also include a single BB processor 934 or a single RF circuit 935.

In addition, the wireless communication interface 933 may support other types of wireless communication schemes, such as a short-range wireless communication scheme, a near-field communication scheme and a wireless local area network (WLAN) scheme in addition to a cellular communication scheme. In this case, the wireless communication interface 933 may include BB processors 934 and RF circuits 935 for each wireless communication scheme.

Each of the antenna switches 936 switches the connection destination of the antennas 937 between multiple circuits (e.g. circuits for different wireless communication schemes) included in the wireless communication interface 933.

Each of the antennas 937 includes a single or multiple antenna elements (such as multiple antenna elements included in a MIMO antenna) and is used for wireless communication interface 933 to transmit and receive wireless signals. As shown in FIG. 12, the car navigation device 920 may include multiple antennas 937. While FIG. 12 illustrates an example in which the car navigation device 920 includes multiple antennas 937, the car navigation device 920 may also include a single antenna 937.

In addition, the car navigation device 920 may include antennas 937 for each wireless communication scheme. In this case, the antenna switch 936 may be omitted from the configuration of the car navigation device 920.

The battery 938 supplies power to the individual blocks of the car navigation device 920 illustrated in FIG. 12 via feeder lines which are partially shown as dashed lines in the figure. The battery 938 accumulates the power provided from the vehicle.

In the car navigation device 920 illustrated in FIG. 12, the transceiver unit 102, the transceiver module 204 for example described in FIG. 1 and FIG. 2 may be implemented by a wireless communication interface 933. At least a portion of the functions may also be implemented by the processor 921. For example, the processor 921 may divide the delay-Doppler region, set different average signal powers for the edge region and the non-edge region of the first delay-Doppler region, generate the first OTFS symbol, and parse the first message or the second message by performing the functions of the resource allocation module 201, the power setting module 202, the OTFS symbol generation module 203, the transceiver module 204, and the message parsing module 205.

The technology of the disclosure may also be implemented as an in-vehicle system (or vehicle) 940 including a car navigation device 920, the in-vehicle network 941 and one or more blocks in a vehicle module 942. The vehicle module 942 generates vehicle data (such as vehicle speed, engine speed and fault information) and outputs the generated data to the in-vehicle network 941.

The basic principles of the disclosure have been described above in connection with specific embodiments, but it should be noted that for those skilled in the art, all or any operations or components of the method and the device in the disclosure can be implemented in hardware, firmware, software or combinations thereof in any computational device (including processors, storage media, etc.) or network of computational device, which can be implemented by those skilled in the art using their basic circuit design knowledge or programming skills after reading the description of the disclosure.

Moreover, the disclosure also provides a program product for storing machine-readable instruction codes. When the instruction codes are read and executed by the machine, the method in the embodiment of the disclosure described above may be performed.

Accordingly, a program product for carrying machine-readable instruction codes is provided. When the instruction codes are read and executed by the machine, the method in the embodiment of the disclosure described above may be performed.

Accordingly, a storage medium for carrying the above-mentioned program product with machine-readable instruction codes is also included in the disclosure. The storage medium includes, but not limited to, a floppy disk, an optical disk, magneto-optical disk, a memory card, a memory stick, and the like.

When the disclosure is implemented by software or firmware, a program constituting the software is installed from a storage medium or a network to a computer (for example, a general purpose computer 1900 shown in FIG. 13) with a dedicated hardware structure, and the computer is capable of executing various functions and the like with various programs installed.

Figure 13:
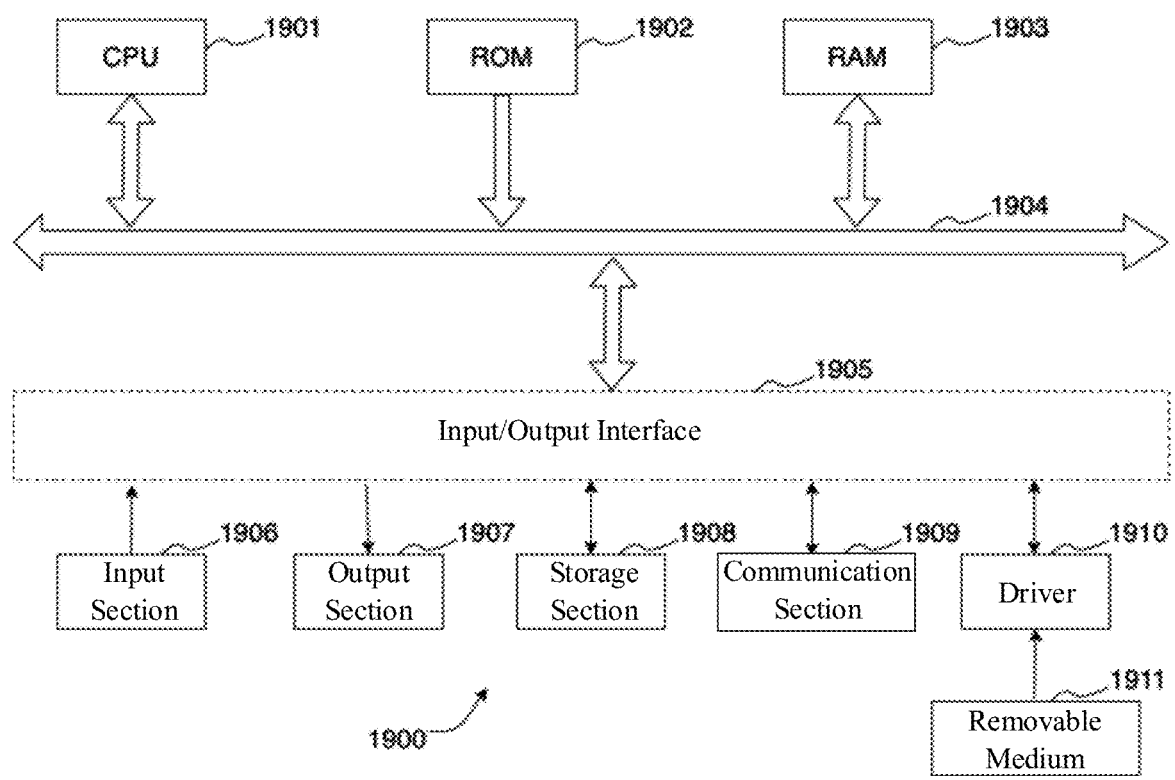
FIG. 13 is a block diagram of an exemplary structure of a general purpose personal computer that can implement a method and/or device and/or system according to an embodiment of the disclosure.

In FIG. 13, a central processing unit (CPU) 1901 executes various processes according to a program stored in a read only memory (ROM) 1902 or a program loaded from a storage section 1908 into a random access memory (RAM) 1903. In the RAM 1903, data required when the CPU 1901 executes various processes and the like are also stored as needed. The CPU 1901, the ROM 1902, and the RAM 1903 are connected to each other via a bus 1904. An input/output interface 1905 is also connected to the bus 1904.

The following components are connected to the input/output interface 1905: an input section 1906 (including a keyboard, a mouse, etc.), an output section 1907 (including a display, such as a cathode ray tube (CRT), a liquid crystal display (LCD), etc., and a speaker, etc.), a storage section 1908 (including a hard disk, etc.), and a communication section 1909 (including a network interface card, such as a LAN card, a modem, etc.). The communication section 1909 performs communication processing via a network such as the Internet. A driver 1910 may also be connected to the input/output interface 1905 as desired. A removable medium 1911 (such as a magnetic disk, an optical disk, a magneto-optical disk, a semiconductor memory or the like) is mounted on the driver 1910 as required, such that a computer program read out therefrom is mounted into the storage section 1908 as required.

In a case where the above-described series of processes are implemented by software, a program constituting the software is installed from a network such as the Internet or a storage medium such as a removable medium 1911.

Those skilled in the art will appreciate that such a storage medium is not limited to the removable medium 1911 illustrated in FIG. 13 in which a program is stored and distributed separately from the device to provide the program to the user. Examples of the removable medium 1911 include a magnetic disk (including a floppy disk (registered trademark)), an optical disk (including an optical disk read only memory (CD-ROM)) and a digital versatile disk (DVD), a magneto-optical disk (including a mini disk (MD) (registered trademark)), and a semiconductor memory. Alternatively, the storage medium may be a ROM 1902, a hard disk contained in the storage section 1908 or the like in which a program is stored and distributed to the user together with the device containing them.

It should also be noted that in the device, the method and the system of the disclosure, components or operations can be decomposed and/or recombined. These decompositions and/or recombination should be regarded as the equivalent solutions of the disclosure. Furthermore, the operations for executing the above-described series of processes can naturally be executed in chronological order according to the explained order, but they do not necessary to perform in chronological order. Certain operations can be implemented in parallel or independently from each other.

Finally, it should be noted that the terms "including", "containing" or any other variant thereof are intended to encompass non-exclusive inclusion, so that the process, the method, the article or the equipment that includes a series of elements includes not only those elements, but also other elements that are not explicitly listed, or elements inherent in the process, the method, the article or the equipment. Moreover, in the absence of further limitations, an element defined by the phrase "including an . . . " does not preclude the existence of another identical element in the process, the method, the article or the equipment in which the element is included.

Although the embodiment of the disclosure has been described in detail above with reference to the accompanying drawings, it should be understood that the implementations described above are intended to illustrate the disclosure only and do not constitute a limitation of the disclosure. For those skilled in the art, various modifications and changes may be made to the implementations described above without departing from the essence and scope of the disclosure. Therefore, the scope of the disclosure is limited only by the appended claims and their equivalent meanings.

The invention claimed is:

1. A device for wireless communication, comprising:
one or more processors, configured to:
divide a delay-Doppler resource occupied by a first Orthogonal Time Frequency Space (OTFS) symbol into M delay-Doppler regions, wherein a first delay-Doppler region is one of the M delay-Doppler regions, and M is a natural number greater than 1;
divide the first delay-Doppler region into an edge region and a non-edge region in a delay shift dimension and a Doppler shift dimension, and set an average signal power of the edge region to be different from an average signal power of the non-edge region; and
generate the first OTFS symbol; and
a transceiver unit, configured to transmit the first OTFS symbol;
wherein the transceiver unit is further configured to receive a first message; and
the one or more processors are further configured to parse the first message used for determining the edge region and the non-edge region;
wherein the transceiver unit is further configured to receive a second message; and
the one or more processors are further configured to parse the second message used for determining a difference between the average signal power of the edge region and the average signal power of the non-edge region.

2. The device of claim 1, wherein the average signal power of the edge region is set to be smaller than the average signal power of the non-edge region.

3. The device of claim 1, wherein the average signal power of the edge region is set to be larger than the average signal power of the non-edge region.

4. The device of claim 1, wherein the average signal power of the edge region on the delay shift dimension and the average signal power of the edge region on the Doppler shift dimension are set to be identical.

5. The device of claim 1, wherein the average signal power of the edge region on the delay shift dimension is set to be different from the average signal power of the edge region on the Doppler shift dimension.

6. The device of claim 1, wherein no data or pilot signals are placed on M−1 delay-Doppler regions of the M delay-Doppler regions other than the first delay-Doppler region, and M is a natural number greater than 1.

7. A device for wireless communication, comprising:
a transceiver unit, configured to receive a first Orthogonal Time Frequency Space (OTFS) symbol; and
one or more processors, configured to:
demodulate the first OTFS symbol;
divide a delay-Doppler resource occupied by the first OTFS symbol into M delay-Doppler regions, wherein K delay-Doppler regions of the M delay-Doppler regions are respectively used for placing data or pilot signals by K transmitting terminals, a first delay-Doppler region is one of the K delay-Doppler regions, the first delay-Doppler region is used for placing data or pilot signals by a first transmitting terminal, M and K are natural numbers not less than 1, and M is not less than K; and
decode a data signal on the first OTFS symbol, wherein the first delay-Doppler region comprises an edge region and a non-edge region in a delay shift dimension and a Doppler shift dimension, and an average signal power of the edge region is different from an average signal power of the non-edge region;
wherein
the one or more processors are further configured to generate a first message used by the first transmitting terminal to determine the edge region and the non-edge region; and
the transceiver unit is further configured to transmit the first message;
wherein
the one or more processors are further configured to generate a second message used by the first transmitting terminal to determine a difference between the average signal power of the edge region and the average signal power of the non-edge region; and
the transceiver unit is further configured to transmit the second message.

8. The device of claim 7, wherein the one or more processors are further configured to decode the data of the K transmitting terminals on the first OTFS symbol by using iterative serial de-interference receiver in the delay shift dimension and the Doppler shift dimension.

9. A method for wireless communication, comprising:
dividing a delay-Doppler resource occupied by a first Orthogonal Time Frequency Space (OTFS) symbol into M delay-Doppler regions, wherein a first delay-Doppler region is one of the M delay-Doppler regions, and M is a natural number not less than 1;
dividing the first delay-Doppler region into an edge region and a non-edge region in a delay shift dimension and a Doppler shift dimension, and setting an average signal power of the edge region to be different from an average signal power of the non-edge region;
generating the first OTFS symbol;
transmitting the first OTFS symbol;
receiving a first message, and parsing the first message, the first message being used for determining the edge region and the non-edge region; and
receiving a second message, and parsing the second message, the second message being used for determining a difference between the average signal power of the edge region and the average signal power of the non-edge region.

10. A method for wireless communication, comprising:
receiving a first Orthogonal Time Frequency Space (OTFS) symbol;
demodulating the first OTFS symbol;
dividing a delay-Doppler resource occupied by the first OTFS symbol into M delay-Doppler regions, wherein K delay-Doppler regions of the M delay-Doppler regions are respectively used for placing data or pilot signals by K transmitting terminals, a first delay-Doppler region is one of the K delay-Doppler regions, the first delay-Doppler region is used for placing data or pilot signals by a first transmitting terminal, M and K are natural numbers not less than 1, and M is not less than K; and
decoding a data signal on the first OTFS symbol, wherein the first delay-Doppler region comprises an edge region and a non-edge region in a delay shift dimension and a Doppler shift dimension, and an average signal power of the edge region is different from an average signal power of the non-edge region;
generating a first message, the first message being used by the first transmitting terminal to determine the edge region and the non-edge region;
transmitting the first message;
generating a second message, the second message being used by the first transmitting terminal to determine a difference between the average signal power of the edge region and the average signal power of the non-edge region;
transmitting the second message.

* * * * *